US008953193B2

(12) United States Patent
Naito

(10) Patent No.: US 8,953,193 B2
(45) Date of Patent: Feb. 10, 2015

(54) MANAGEMENT SYSTEM, MONITORING APPARATUS AND MANAGEMENT

(75) Inventor: Yoshiko Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 13/608,342

(22) Filed: Sep. 10, 2012

(65) Prior Publication Data

US 2013/0094046 A1 Apr. 18, 2013

(30) Foreign Application Priority Data

Oct. 13, 2011 (JP) ................................ 2011-226225

(51) Int. Cl.
*G06K 15/00* (2006.01)
*G03G 15/00* (2006.01)

(52) U.S. Cl.
CPC ........ *G03G 15/5079* (2013.01); *G03G 15/5083* (2013.01)
USPC ........... 358/1.14; 358/1.15; 358/1.16; 399/79

(58) Field of Classification Search
USPC ................. 358/1.13, 1.14, 1.15, 1.16; 399/79
See application file for complete search history.

(56) References Cited

U.S. PATENT DOCUMENTS

| | | | | |
|---|---|---|---|---|
| 7,436,552 | B2 * | 10/2008 | Nozato | 358/406 |
| 2007/0035638 | A1 * | 2/2007 | Naitoh | 348/226.1 |
| 2008/0137130 | A1 * | 6/2008 | Ferlitsch | 358/1.15 |
| 2011/0216354 | A1 * | 9/2011 | Naito | 358/1.15 |

FOREIGN PATENT DOCUMENTS

JP 2007-018500 A 1/2007

* cited by examiner

*Primary Examiner* — Vu B Hang
(74) *Attorney, Agent, or Firm* — Fitzpatrick, Cella, Harper & Scinto

(57) ABSTRACT

A monitoring apparatus monitors a job processing status of an image forming apparatus. If it is determined that the image forming apparatus is not processing a job, creation of a snapshot of a sub-set (minimum required charging counter values for charging) is requested from the image forming apparatus. When charging information is transmitted to a management server, if it is determined that a usual full-set (department counter values and charging counter values) of data has not been acquired, the created sub-set is transmitted.

12 Claims, 16 Drawing Sheets

FIG. 7A

701

| |
|---|
| NUMBER OF DEPARTMENTS n1 |
| NUMBER OF COUNTERS m1 |
| DEPARTMENT ID 1 |
| DEPARTMENT ID 2 |
| : |
| DEPARTMENT ID n1 |

FIG. 7B

702

| | |
|---|---|
| DEPARTMENT ID n1 | |
| COUNTER ID 1 | 1000 |
| COUNTER ID 2 | 587 |
| : | : |
| COUNTER ID m1 | 134 |

FIG. 7C

| | |
|---|---|
| NUMBER OF COUNTERS n2 (703) | |
| COUNTER ID 1 | 15800 |
| COUNTER ID 2 | 4670 |
| : | : |
| COUNTER ID n2 | 8791 |

704

F I G. 8

| | | |
|---|---|---|
| 801 | DEVICE SPECIFICATION INFORMATION | 192.168.1.10 |
| 802 | DATA ACQUISITION TIME | 2011/6/29 11:35 |
| 803 | NUMBER OF DEPARTMENTS (NUMBER OF DEPARTMENTS m) | 2 |
| 804 | NUMBER OF COUNTER TYPES FOR EACH DEPARTMENT (NUMBER OF COUNTERS m1) | 3 |
| 805 | NUMBER OF CHARGING COUNTER TYPES (NUMBER OF COUNTERS n2) | 5 |
| 806 | NUMBER OF SNAPSHOT COUNTER TYPES (NUMBER OF COUNTERS n3) | 2 |
| 807 | DEPARTMENT ID 1 | AAAA |
| 808 | DEPARTMENT COUNTER-1 (TOTAL NUMBER OF SHEETS) | 1000 |
| 809 | DEPARTMENT COUNTER-2 (NUMBER OF COLOR COPY SHEETS) | 200 |
| 810 | DEPARTMENT COUNTER-3 (NUMBER OF COLOR PRINT SHEETS) | 400 |
| 811 | DEPARTMENT ID 2 | BBBB |
| 812 | DEPARTMENT COUNTER-1 (TOTAL NUMBER OF SHEETS) | 1500 |
| 813 | DEPARTMENT COUNTER-2 (NUMBER OF COLOR COPY SHEETS) | 350 |
| 814 | DEPARTMENT COUNTER-3 (NUMBER OF COLOR PRINT SHEETS) | 350 |
| 815 | CHARGING COUNTER-1 (TOTAL NUMBER OF SHEETS) | 2500 |
| 816 | CHARGING COUNTER-2 (NUMBER OF COLOR COPY SHEETS) | 550 |
| 817 | CHARGING COUNTER-3 (NUMBER OF COLOR PRINT SHEETS) | 950 |
| 818 | CHARGING COUNTER-4 (NUMBER OF COLOR LARGE SHEETS) | 300 |
| 819 | CHARGING COUNTER-5 (NUMBER OF MONOCHROME LARGE SHEETS) | 400 |
| 820 | DATA ACQUISITION TIME | 2011/6/30 12:00 |
| 821 | CHARGING COUNTER-1 (TOTAL NUMBER OF SHEETS) | 2650 |
| 822 | CHARGING COUNTER-2 (NUMBER OF COLOR COPY SHEETS) | 600 |

FIG. 11A

| TRANSMISSION METHOD NAME | NUMBER OF ITEMS OF DATA TO BE TRANSMITTED | TYPE OF DATA TO BE TRANSMITTED |
|---|---|---|
| TRANSMISSION OF COUNTER FOR CHARGING | 2 | COUNTER FOR EACH DEPARTMENT, CHARGING COUNTER |

FIG. 11B

| TRANSMISSION METHOD NAME | NUMBER OF ITEMS OF DATA TO BE TRANSMITTED | TYPE OF DATA TO BE TRANSMITTED |
|---|---|---|
| TRANSMISSION OF COUNTER FOR CHARGING | 1 | CHARGING COUNTER |

FIG. 11C

| |
|---|
| ACQUISITION START TIME |
| ACQUISITION INTERVAL |
| RE-ACQUISITION START TIME |
| RE-ACQUISITION INTERVAL |
| NEXT ACQUISITION START TIME |
| NEXT RE-ACQUISITION START TIME |

FIG. 11D

| |
|---|
| ACQUISITION START TIME |
| ACQUISITION INTERVAL |

MANAGEMENT SYSTEM, MONITORING APPARATUS AND MANAGEMENT

BACKGROUND OF THE INVENTION

1. Field of the Invention

The present invention relates to a management system, a monitoring apparatus, and a management method for monitoring, for example, a status of an image forming apparatus and the like, and particularly to information acquisition from an image forming apparatus.

2. Description of the Related Art

In the copy machine business, it has been general practice to acquire charging information, such as the total number of printed sheets from an image forming apparatus, such as a copy machine, and charge according to the acquired charging information. For example, in a client company it has been common practice to count, by department, the number of sheets printed on several image forming apparatuses installed in the company, and charge the maintenance fee to each department based on the information on the counted number of sheets.

Also, when the number of printed sheets by department and the number of printed sheets by an image forming apparatus are sequentially acquired from counters provided for the respective apparatuses that indicate current values, in some cases the sum of the number of printed sheets by department does not agree with the sum of the number of printed sheets by apparatus due to printing in progress, and therefore a method for preventing such disagreement has been proposed in, for example, Japanese Patent Laid-Open No. 2007-018500 (to be referred to as Patent document 1). With this method, the number of printed sheets by an image forming apparatus is acquired before and after the acquisition of the number of printed sheets by department, and it is determined that the printed sheet number acquisition has been successful if the number of printed sheets by apparatus does not change.

However, in the case where printing is uninterruptedly executed on an image forming apparatus that is a target of the printed sheet number acquisition, for example in the case of an image forming apparatus installed in a POD center, the printed sheet number acquisition often fails with the method disclosed in Patent document 1. The impact of this problem is reduced by counting the number of printed sheets for users of the image forming apparatuses outside of business hours, but the image forming apparatuses might be turned off at the close of business hours, or there is the possibility that the company operates on a 24 hour a day basis due to automation or the like. In such cases, the charging information may not be able to be transmitted to a distant management server. If the charging information is not transmitted to the management server on the due date for billing (bill creation date), a representative from a sales company needs to visit the client company and check the number of printed sheets.

SUMMARY OF THE INVENTION

The present invention was made in consideration of the above such situations, and provides a system for transmitting charging information on an image forming apparatus, even if printing is uninterruptedly executed on this image forming apparatus, using functions provided by the image forming apparatus.

According to one aspect of the present invention, there is provided a management system for managing information concerning an amount of usage of an image forming apparatus, the system comprising the image forming apparatus and a monitoring apparatus connected to the image forming apparatus, wherein the image forming apparatus comprises: a recording unit configured to record, as the counter information, counter values of a plurality of types in a storage device in the image forming apparatus; and a copying unit configured to make, in the storage device, a copy of a part of the counter information between image forming operations, the monitoring apparatus comprises: a first acquisition unit configured to acquire the counter values of the plurality of types recorded in the storage device; a storing unit configured to store the acquired counter values of the plurality of types as valid counter values if the acquired counter values are consistent with one another; and a second acquisition unit configured to acquire, from the image forming apparatus, the part of the counter values whose copy was made by the copying unit, and wherein the storing unit storing, as valid counter values, the part of the counter values whose copy was made by the copying unit that was acquired by the second acquisition unit if the acquired counter values of the plurality of types are inconsistent with one another.

According to another aspect of the present invention, there is provided a monitoring apparatus for acquiring counter values as counter information from an image forming apparatus having a recording unit configured to record counter values of a plurality of types in a storage device in the image forming apparatus and a copying unit configured to make, in the storage device, a copy of a part of the counter information between image forming operations, the monitoring apparatus comprising: a first acquisition unit configured to acquire the counter values of the plurality of types recorded in the storage device; a storing unit configured to store the acquired counter values of the plurality of types as valid counter values if the acquired counter values are consistent with one another; and a second acquisition unit configured to acquire, from the image forming apparatus, the part of the counter values whose copy was made by the copying unit, wherein the storing unit storing, as valid counter values, the part of the counter values whose copy was made by the copying unit that was acquired by the second acquisition unit if the acquired counter values of the plurality of types are inconsistent with one another.

According to the present invention, even if the state where the counters advance during counter value acquisition and the consistency between the counters cannot be kept continues, it is possible to acquire information necessary for charging by copying the counters while the image forming apparatus is not forming images.

Further features of the present invention will become apparent from the following description of exemplary embodiments (with reference to the attached drawings).

BRIEF DESCRIPTION OF THE DRAWINGS

FIGS. 7A to 7C are diagrams showing storage modes for counter values stored in the image forming apparatus in an embodiment;

FIG. 8 is a diagram showing a storage mode for counters stored in the monitoring apparatus 101 in an embodiment;

FIGS. 11A to 11D are diagrams showing exemplary data on counter acquisition and transmission settings stored in the monitoring apparatus 101;

DESCRIPTION OF THE EMBODIMENTS

Embodiment 1

Figure 1:
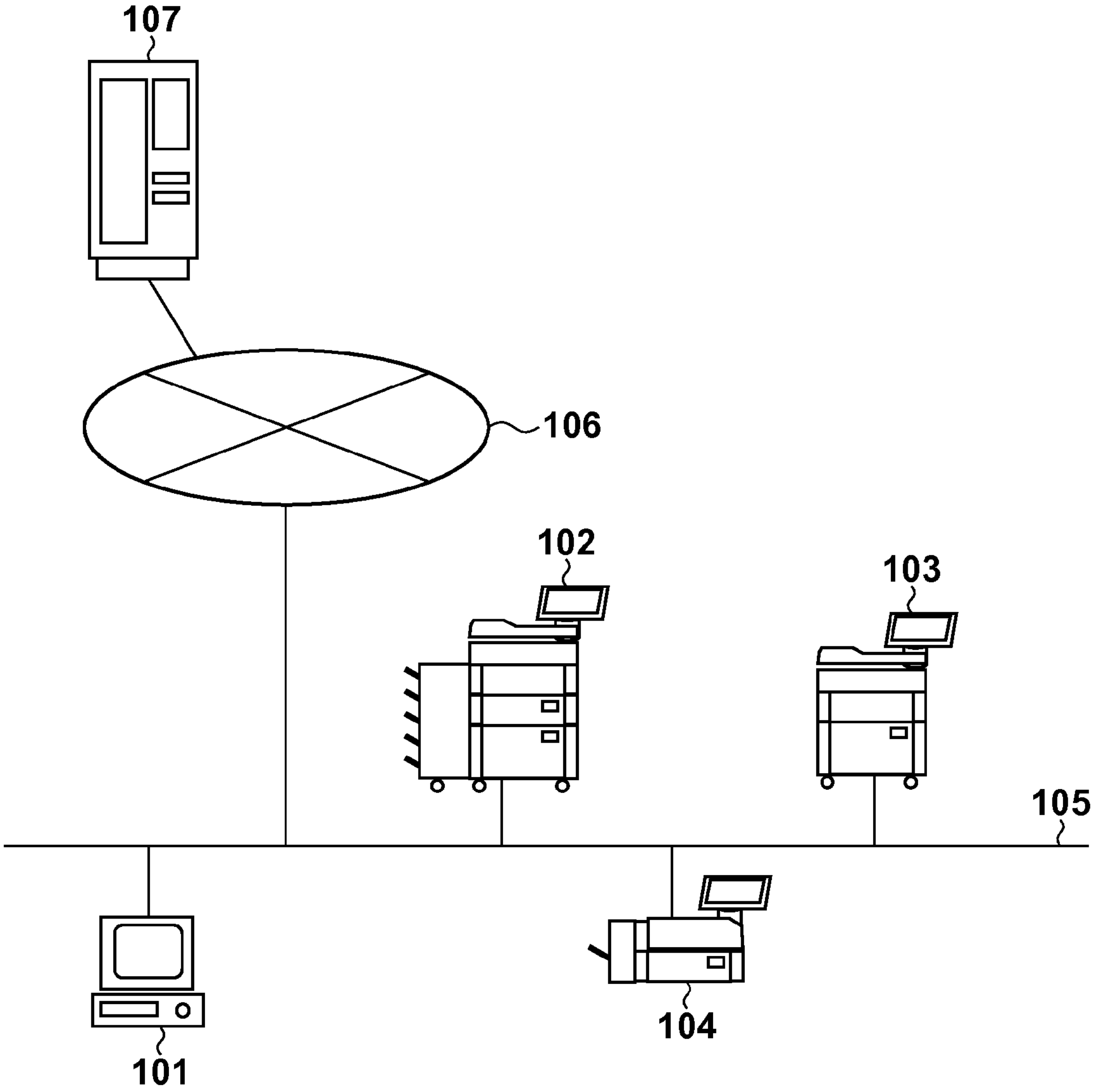
FIG. 1 is a diagram showing an exemplary system in an embodiment.

Hereinafter, the best mode for implementing the present invention will be described referring to the drawings.

FIG. 1 is a diagram showing an exemplary management system configuration in the present invention. A monitoring apparatus 101 is an apparatus within a local system that is a client network in which image forming apparatuses 102, 103, and 104, which are monitoring targets, in a client company or the like are installed, and the monitoring apparatus 101 is implemented by a computer, for example. The monitoring apparatus 101 transmits operation information acquired from the image forming apparatuses 102, 103, and 104 via the Internet 106 to a management apparatus 107. Here, the operation information includes counter information (or charging information) that indicates the printed sheet number and the number of times when each component is used, information on failure such as an error or jamming, and history information such as an environment log. The counter information is information indicating the amount of usage of the image forming apparatuses, and is information serving as the basis for calculation of a maintenance fee for each image forming apparatus. Numerical references 102, 103, and 104 denote the image forming apparatuses that are monitoring targets for the management system. Examples of the image forming apparatuses include printers and multifunction peripherals provided with scanner and facsimile functions and the like, and the processing relevant to the present invention described later can be applied to any kinds of device. Note that in the following description, the image forming apparatus 102 is a representative image forming apparatus.

The management apparatus 107 is an apparatus for remotely performing centralized management of the monitoring apparatus and the image forming apparatuses, and is implemented by a computer, for example. The content of management includes settings of a counter information transmission schedule in the monitoring apparatus 101 and settings of types of information included in the operation information to be collected in the image forming apparatus 102 and the monitoring apparatus 101. Note that the management apparatus 107 is connected to a large number of client networks via the Internet 106, and manages a huge number of monitoring target apparatuses connected to the client networks. Also, the management apparatus 107, upon being informed of an occurrence of a fatal failure event by an image forming apparatus, performs notification processing for contacting a maintenance engineer, or the like.

Here, among the types of information included in the operation information to be managed by the management apparatus 107, the counter information is the information that should be acquired most regularly. The counter information includes the printed sheet number used for charging and the like. The managed printed sheet number includes the total number of sheets printed by each image forming apparatus, as well as the printed sheet number by department and the printed sheet number by user. In that case, if the printed sheet number needs to be strictly managed because it is used for charging or the like, it is necessary to guarantee the consistency between the total number of sheets printed by each image forming apparatus and the sum of the printed sheet number by department (and by user).

Therefore, in the case where, for example, the monitoring apparatus 101 is installed within a local system such as a network in an office, it can be conceived that that acquired printed sheet number are temporarily stored, and the counter information is transmitted to the management apparatus 107 only after the consistency is verified.

In the management system in the present embodiment, in consideration of the foregoing problem, an appropriate operation information collection method is implemented suitably even for a situation where it is difficult to guarantee the consistency between the number of sheets printed by each image forming apparatus and the sum of the printed sheet number by department (or by user).

The monitoring apparatus 101, upon being connected to the image forming apparatus 102 that is set as a monitoring target, collects the operation information from the image forming apparatus 102 via a network 105. In the present embodiment, two types of information collection method for the monitoring apparatus are used: namely a method of acquiring the operation information in response to a request from the image forming apparatus 102 (pull method), and a method of acquiring the operation information spontaneously transmitted by the image forming apparatus 102 to the monitoring apparatus 101 (push method).

Hardware Configuration of Monitoring Apparatus

Figure 2:
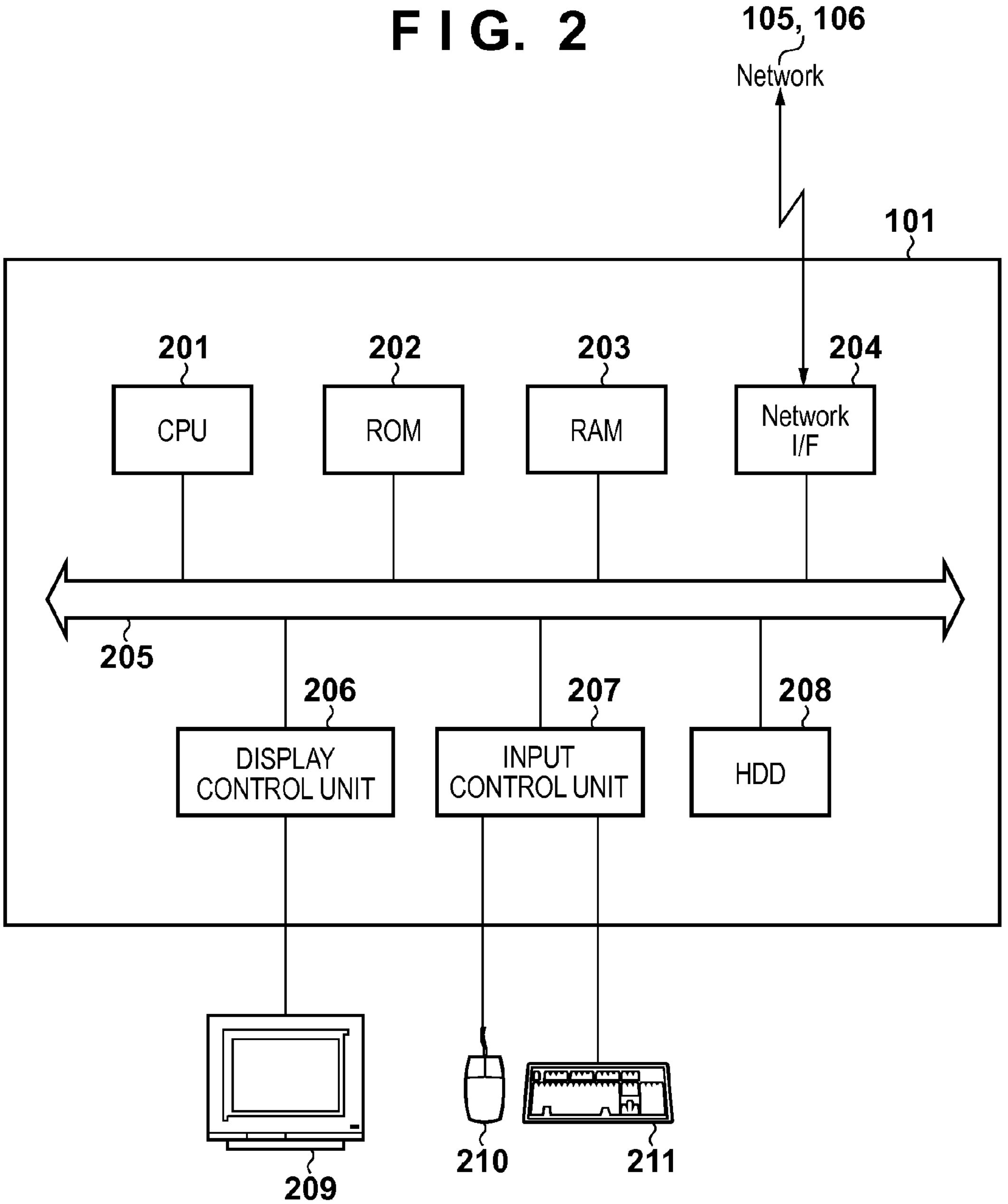
FIG. 2 is a diagram showing an exemplary hardware configuration in a monitoring apparatus 101 in an embodiment.

FIG. 2 is a hardware configuration diagram of the monitoring apparatus 101. A CPU 201 is for controlling the overall monitoring apparatus 101. A ROM 202 is a read-only memory for storing a boot program necessary for activating the system and various programs for implementing monitoring processing. A RAM 203 is used as a working memory or the like needed when the CPU 201 executes a program. The network I/F 204 is a component for communicating with the image forming apparatuses, and communicating with the management apparatus 107 via the Internet 106. A display control unit 206 is connected to a display unit 209, and an input control unit 207 is connected to input units 210 and 211. The information necessary for operating the system, including the information from the management apparatus 107, is input and output through those input/output devices 209 to 211. The HDD 208 stores programs executed by the CPU 201, application information, and the like. The above-mentioned components are connected to a system bus 205.

Hardware Configuration of Image Forming Apparatus

Figure 3:
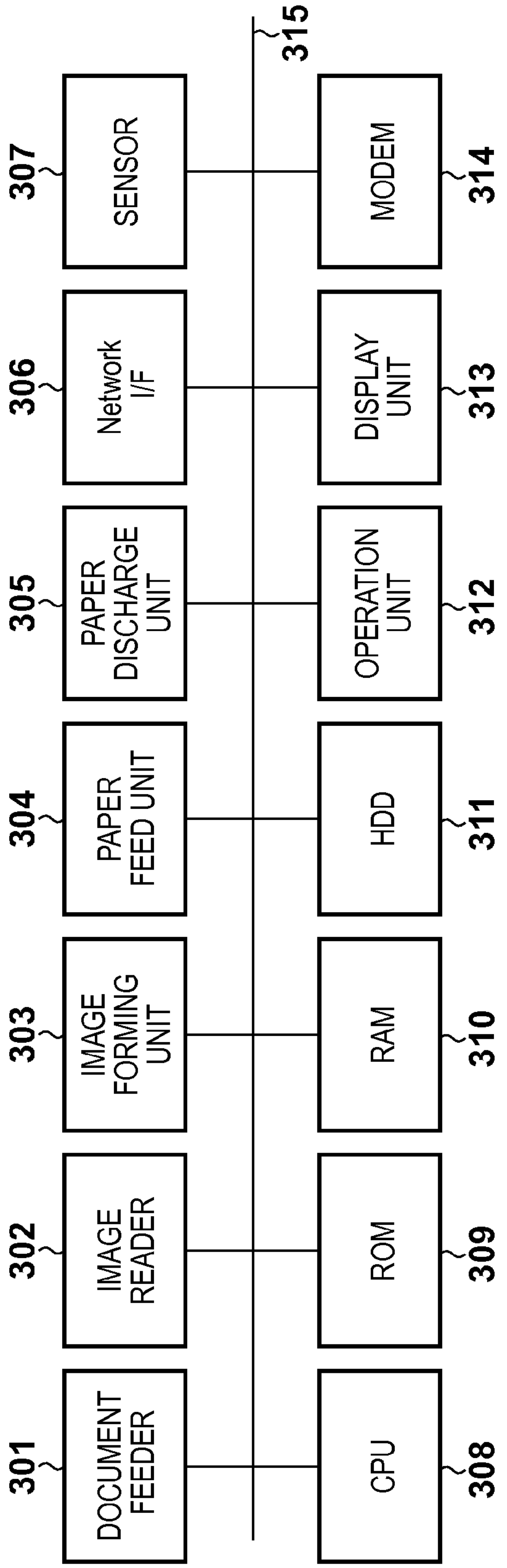
FIG. 3 is a diagram showing an exemplary hardware configuration of an image forming apparatus in an embodiment.

FIG. 3 is a hardware configuration diagram of each of the image forming apparatuses 102 to 104 used in the present embodiment. An document feeder 301 automatically sends an original document to an image reader 302, and this image reader (scanner) 302 reads the original. An image forming unit 303 converts the read original or data received from the network or the like into a print image and prints the print image. A paper feed unit 304 feeds printing papers. A paper discharge unit 305 performs post-processing such as printed paper sorting and stapling and the like, and discharges the printed paper. The network I/F 306 is connected to a LAN, the Internet, or the like, and communicates with external devices. A sensor 307 detects a status of each part of the image forming apparatus. A CPU 308 controls the overall image forming apparatus. The ROM 309 stores a boot program necessary for activating the system and various programs for implementing various kinds of processing. The RAM 310 is used as a working memory or the like needed for storing data to be temporarily stored and when the CPU 201 executes a program. A HDD 311 stores operation information including programs associated with various kinds of processing and various types of information detected in the image forming apparatus, user information transmitted from external devices, and the like. A printed sheet number counter for each image forming apparatus and a printed sheet number counter for each department are stored in the HDD 311. Of course these counters can also be stored in a power back-up RAM or an erasable ROM. An operation unit 312 accepts an instruction input. A display unit 313 displays the operation information on the image forming apparatus, information related to operations on the operation unit 312, and the like. A modem 314 is connected to a connection line for external connection. A system bus 315 connects the above-listed components with one another.

The methods in the present embodiment can also be applied to an image forming apparatus having an apparatus configuration other than that shown in FIG. 3, specifically an image forming apparatus in which operations or mechanisms of the image reader 302, the image forming unit 303, the modem 314, and the like are different, or an image forming apparatus that does not include those components.

Software of Monitoring Apparatus

Figure 4:
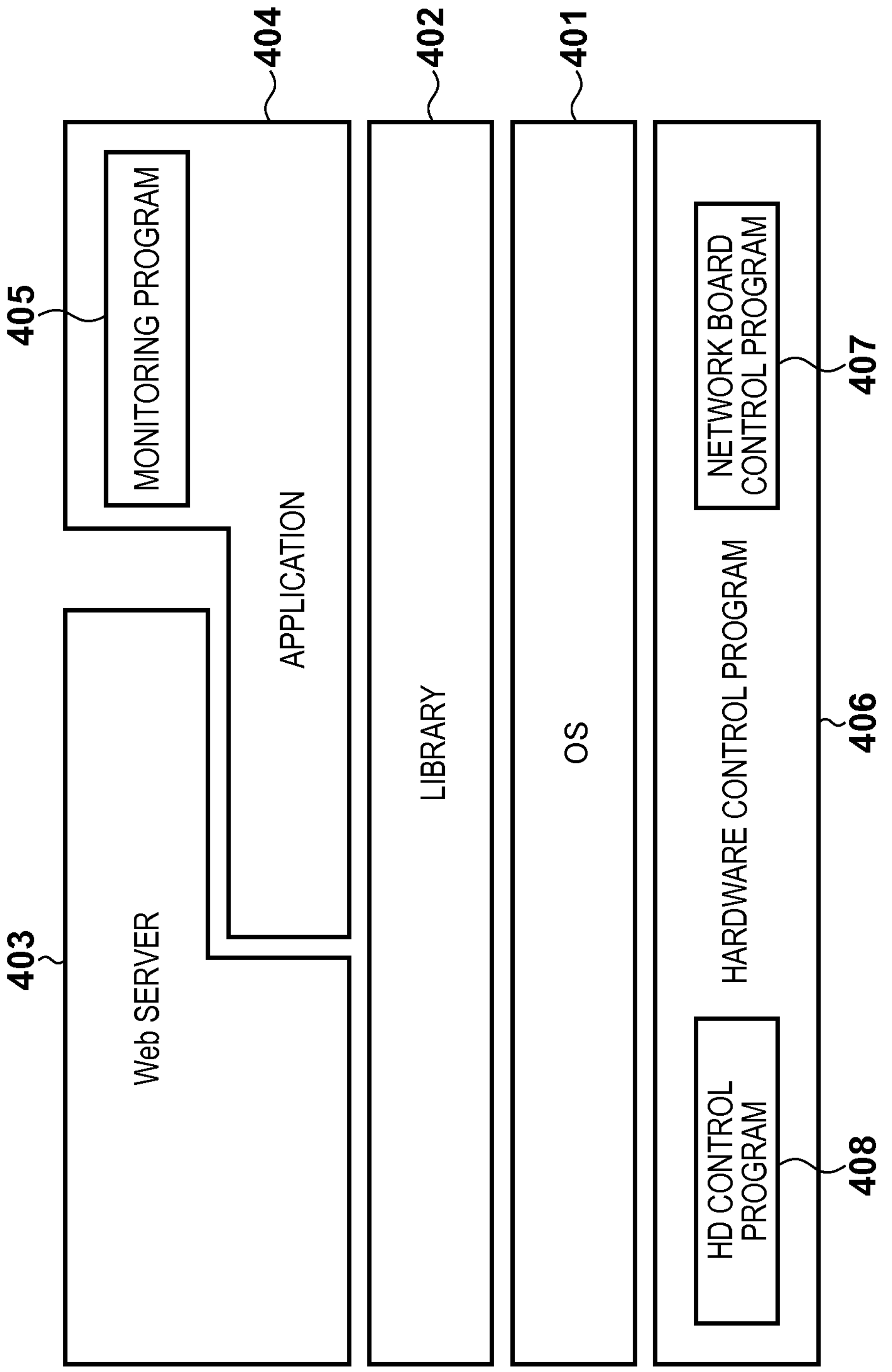
FIG. 4 is an exemplary software configuration of the monitoring apparatus 101 in an embodiment.

FIG. 4 is a software block diagram of the monitoring apparatus 101. The software of the monitoring apparatus 101 includes an OS (operating system) 401, a library 402, a Web server 403, and an application 404. The software also includes, as a part of the application 404, a monitoring program 405 for managing information related to the image forming apparatus 102, performing control based on the information from the management apparatus 107, and the like. A hardware control program 406 includes, as a part thereof, a network board control program 407, and a HD (hard disk) control program 408.

Figure 5:
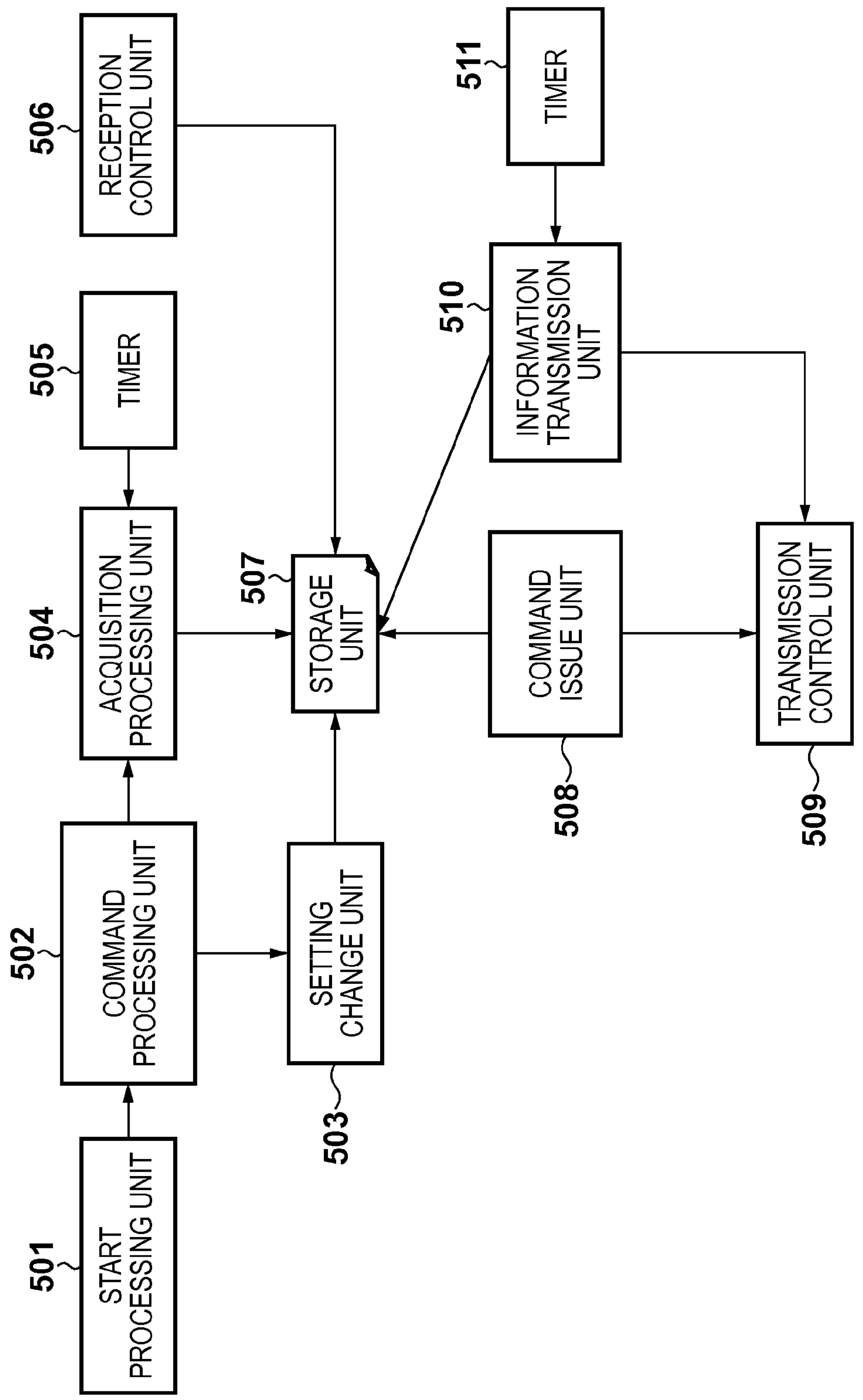
FIG. 5 is a diagram showing a relationship among modules in the monitoring apparatus 101 in an embodiment.

FIG. 5 is a module relationship diagram of the monitoring apparatus 101. The CPU 201 in the monitoring apparatus 101 functions as modules 501 to 507 by executing the monitoring program 405.

A start processing unit 501 controls processing for starting the monitoring program. The start processing unit 501 invokes a command processing unit 502. The command processing unit 502 accepts setting, and requests for change of, a due date that is the last day of a billing period for a client based on the counter information, and invokes a setting change unit 503.

The setting change unit 503 stores the due date information in a storage unit 507 based on the information acquired in response to the above-mentioned request from the command processing unit 502. The storage unit 507 causes the RAM 203 or the HDD 208 to store the information to be stored. The storage unit 507 also determines whether the collection method suitable for the type of information to be acquired from the image forming apparatus 102 is the push method or the pull method.

The acquisition processing unit 504 reads the due date information from the storage unit 507 and performs processing in accordance with the due date. The acquisition processing unit 504 also starts processing for acquiring the counter information from the image forming apparatus 102 in response to a notification from a timer 505, and stores the acquired information in the storage unit 507.

A reception control unit 506 receives a notification from the image forming apparatus 102 via the network I/F 204, and stores the received notification in the storage unit 507.

A command issue unit 508 acquires, from the storage unit 507, data on the notification from the image forming apparatus 102, and issues, as needed, a command to the image forming apparatus 102 via a transmission control unit 509.

The transmission control unit 509 transmits the command to the image forming apparatus 102 via the network I/f 204.

Further, an information transmission unit 510 starts processing in response to a notification from a timer 511, reads, from the storage unit 507, the counter information acquired from the image forming apparatus 102, and transmits the counter information to the management apparatus 107 via the transmission control unit 509. The information transmission unit 510, when transmitting the information, determines which item of the counter information stored in the storage unit 507 to transmit.

Configuration Modules in Image Forming Apparatus

Figure 6:
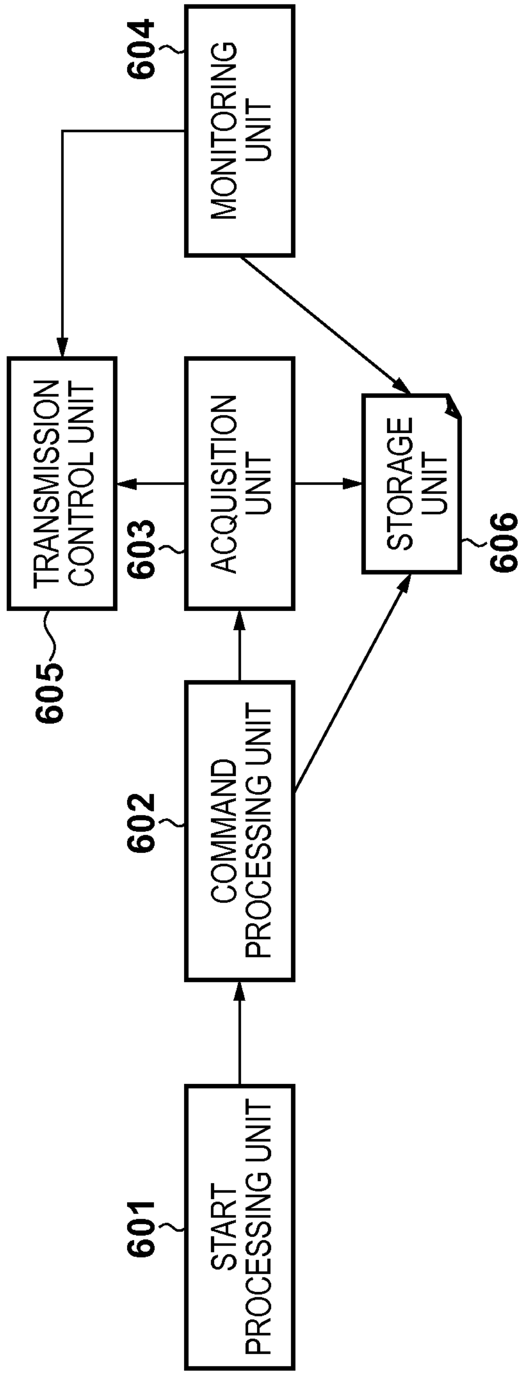
FIG. 6 is a diagram showing a relationship among modules in the image forming apparatus in an embodiment.

FIG. 6 is a module relationship diagram of each of the image forming apparatuses 102 to 104. Also in the following description, the image forming apparatus 102 is the representative image forming apparatus. Also in the image forming apparatus 102, the CPU 308 functions as modules 601 to 608 by executing a monitoring control program (not shown).

A start processing unit 601 controls processing for starting the monitoring function of the image forming apparatus 102 based on the above-mentioned control program. The start processing unit 601 invokes a command processing unit 602. The command processing unit 602 accepts, analyzes, and processes a command from the operation unit 312 or from the monitoring apparatus 101 via the network I/F 306.

If the command accepted by the command processing unit 602 is determined to be a counter information transmission request from the monitoring apparatus 101, an acquisition unit 603 transmits the counter information stored in a storage unit 606 to the monitoring apparatus 101 via a transmission control unit 605.

If the command accepted by the command processing unit 602 is determined to be a snapshot recording request from the monitoring apparatus 101, current counter values (the counters for each image forming apparatus and for each department) are stored (copied) in the storage unit 606. The copied counter values are retained unless the values are overwritten or deleted in response to a new snapshot recording request. Note that the snapshot is a copy of the counters at a certain point in time generated by the image forming apparatus. The trigger of generation may be an instruction from the monitoring apparatus 101, or the like. The counters to be copied may be selected as appropriate, but include at least a charging counter (a first counter serving as the basis for charging). Of course a department counter (a second counter that indicates frequency of use by each user) may be contained in the snapshot, while it should be decided depending on the number of target counters or the like because the snapshot needs to be created in a short time.

Further, if the command accepted by the command processing unit 602 is determined to be a printing status change notification request from the monitoring apparatus 101, an IP address of the monitoring apparatus 101, which is designated to be the notification destination, is stored in the storage unit 606. At this time, as information indicating whether or not the notification destination is stored, a value indicating a stored state is set.

A monitoring unit 604 monitors the printing status of the image forming apparatus. If, for example, the printing status changes from “printing” to “not printing”, the monitoring unit 604 refers to the storage unit 606, and determines whether or not the notification destination is stored. If it is determined that the notification destination is stored, the monitoring unit 604 notifies the printing status via the transmission control unit 605 to the notification destination, that is, the monitoring apparatus 101.

The storage unit 606 stores various data in the HDD 311 in the present embodiment. As mentioned above, the data may alternatively be stored in the RAM 310 or the ROM 309.

The above is the basic configuration of the management system according to one embodiment of the present invention. Hereinafter, the details of the embodiment of the present invention, that is, the details of counter information acquisition processing for transmitting the counter information to the management apparatus 107 even if the department counter and the charging counter, which are two different types of counters, are not consistent with each other, will be described with reference to FIGS. 7A to 17.

Department Counter and Charging Counter

Here, the “charging counter” means a counter for counting the number of surfaces on which an image is formed (the number of images) by each image forming apparatus, regardless of departments. The charging counter counts the printed sheet number serving as the basis for charging, and is provided for each size, and respectively for colors and monochrome. These are referred to as types of counter, and the counters of the respective types are referred to as type counters. Apart from the type counters, there is also a counter that indicates the total printed sheet number. This is referred to as total counter. Each type counter indicates, by type, the value of the total counter that indicates the total number of formed images. The department counter indicates the printed sheet number by department, and includes the type counters and the total counter for each department. That is, the department counter shows the breakdown by department of the total counter that indicates the total number. Here, the department counter may have a different configuration from that of the charging counter, and may include, for example, only the total counter. Note that as for the printed “sheet” number in the present embodiment, in some cases each side of a sheet as in duplex printing is counted as 1. In this case, each counter indicates the number of surfaces (screens) formed in the image forming apparatus.

For example, if the image forming apparatus 102 is assigned to two departments A and B, and the department counter values of a certain type for the departments A and B are 1000 and 1500, respectively, the charging counter value of this type for the image forming apparatus is 2500. Also, the types of the department counter does not necessarily need to agree with those of the counter for the image forming apparatus counter, and for example, there may be a counter value that exists only in the charging counter in the image forming apparatus.

FIGS. 7A to 7C are diagrams for illustrating exemplary format of the counter values stored in the image forming apparatus according to an embodiment of the present invention. In the present embodiment, a single image forming apparatus is used by one or more departments, and the image forming apparatus 102, the monitoring apparatus 101, and the management apparatus 107 store the counter information on each department registered on the image forming apparatus that is the monitoring target in the format shown in FIGS. 7A to 7C.

FIGS. 7A and 7B shows the storage format of the department counter, and the image forming apparatus 102 stores a department ID table 701 (FIG. 7A) that contains the number of departments, the number of counter types for each department and department IDs for the departments, and a department counter table 702 (FIG. 7B) that contains type counter IDs for each department and values of the counters. The department counter table 702 may be called simply a department counter. FIG. 7C indicates the storage format of the charging counters having counter values for each respective image forming apparatus. In the present embodiment, as the charging counter, the counter type number 703 and a table 704 of counter values of the respective counter types are stored. Here, the counter value for each image forming apparatus is a counter value for a single image forming apparatus, regardless of departments or users. If the counters of the same type are included both in the department counter and the charging counter, the counter value of this type for each image forming apparatus should agree with a sum of the counter values of this type accumulated by department.

Note that in the following description of the present embodiment, a counter ID-1 among the counter IDs for the departments and a counter ID-1 among the counter IDs for the charging counter respectively are the total counters. If there are corresponding type counters, of course those counters can be handled similarly to the total counter.

Note that apart from the above-mentioned counters, a copy of the counters at a certain point in time, that is, a snapshot, is stored in the storage unit 606. The snapshot is created in response to an instruction from the monitoring apparatus 101. As described later, the snapshot is created between image forming operations.

Figure 14:
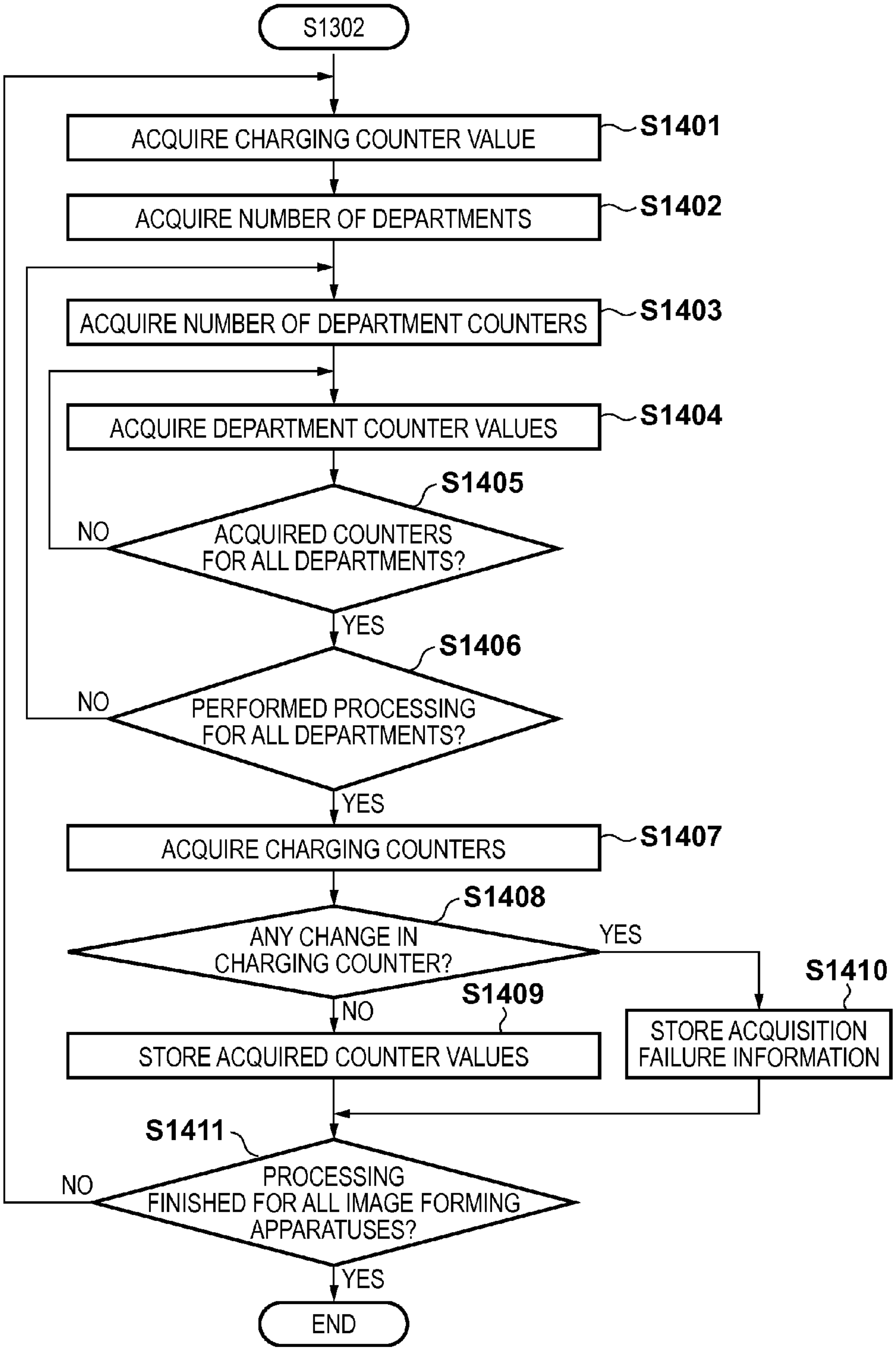
FIG. 14 is a flowchart showing a procedure of counter value acquisition processing by the monitoring apparatus 101.

FIG. 8 is a diagram showing an exemplary table held by the monitoring apparatus 101 in order to keep the department counter values, charging counter values, and counter values acquired as the snapshot for the image forming apparatus that are acquired by the monitoring apparatus 101 through a counter acquisition operation, which will be described using the flowcharts in FIGS. 14, 15, and 17. The storage format shown in FIG. 8 basically conforms to the counter storage format illustrated in FIGS. 7A to 7C.

A device specification information entry 801 stores identification information on a corresponding image forming apparatus, such as an IP address thereof, is stored. This information needs only to be information with which the image forming apparatus in communication with the monitoring apparatus 101 can be identified, and is not limited to an IP address. In a data acquisition time entry 802, the time when the counter values were acquired is recorded, and this time can be used to determine whether or not the department counter values and the charging counter values were acquired with consistency.

Total sheet number entries 808 and 812 indicate the total counter values for a certain department, regardless of sheet sizes, sheet types, and job types. Color copy sheet number entries 809 and 813 indicate the number of sheets output in a color copy job. Color print sheet number records 810 and 814 indicate the number of sheets output in color PDL printing. Here, PDL printing refers to printing executed by submission of a PDL job from an external computer to the image forming apparatus.

Meanwhile, charging counter-1 (total number of sheets) entries 815 and 821 indicate the total counter values each for a single image forming apparatus used by several departments. The counter entries 815, 808, and 812 indicates values acquired so as to be consistent with one another, and therefore the value of the counter entry 815 agrees with the sum of the values of the counter entries 808 and 812. In the example, the counter entry 821 indicates the charging counter value acquired after the values of the counter entries 815, 808, and 812 are acquired, and the value of the counter entry 821 increases due to printing processing that proceeds during that counter value acquisition. Counter entry 818 (charging counter-4, color large) indicates the number of sheets of, for example, A3 or a larger paper size printed in color, and counter entry 819 (charging counter-5, monochrome large) indicates the number of sheets of, for example, A3 or a larger paper size printed in monochrome.

Regarding the charging counters, the sum of the values of the charging counter-2 to the charging counter-5 (counter entries 817 to 819) agrees with the value of the charging counter-1 (counter entry 816). However, those values do not necessarily have to agree with each other. For example, the counter value storing table shown in FIG. 8 may be configured without the charging counter-5.

Counter entries 821 and 822 are snapshots of a part of the charging counter entries 815 to 819.

Counter Acquisition Timing

Figure 9:
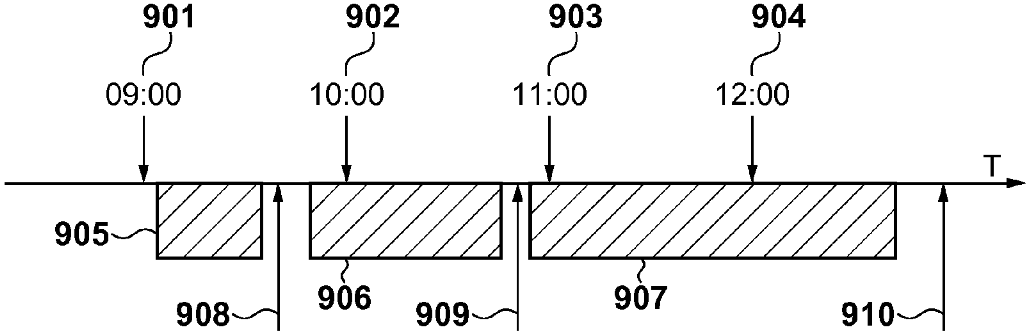
FIG. 9 is a diagram illustrating timings of counter value acquisition in the monitoring apparatus 101 in an embodiment.

FIG. 9 is a diagram for illustrating the timing when the monitoring apparatus 101 acquires the department counter and the charging counter, the timing when the monitoring apparatus 101 requests snapshot creation from the image forming apparatus, and the case where the department counter and the charging counter are not consistent with each other. In FIG. 9 the arrow extending from left to right represents the lapse of time.

Timings 901 to 904 are the timings when the monitoring apparatus 101 regularly acquires the department counter values and the charging counters value from the image forming apparatus 102. Timings 908 to 910 are the timings of irregular snapshot creation. Periods 905 to 907 are the periods during which a job is executed in an image forming apparatus that is the monitoring target.

As will be described in detail using the flowchart in FIG. 14, the monitoring apparatus 101 acquires, in the regular counter value acquisition, the charging counter values, the department counter values, and again the charging counter values in this order from the image forming apparatus.

If the monitoring apparatus 101 acquires the department counter values and the charging counter values at the timing 901, the initially acquired charging counter values agree with the finally acquired charging counter values because no job is being executed at this timing. Therefore, the consistency between the department counter and the charging counter are kept, and it is determined that the counter value acquisition was successful. Meanwhile, at the timing 902 a job is being executed, and so the initially acquired charging counter values can disagree with the finally acquired charging counter values. If the values disagree with each other, the consistency between the department counter and the charging counter is not kept, and it is determined that the counter value acquisition failed.

Meanwhile, the monitoring apparatus 101 requests snapshot creation from the image forming apparatus at the timing 908, 909, 910 or the like when no job is being executed. Here, since the data volume of the department counter values and the charging counter values is significantly larger than that of snapshots, it is difficult to complete the counter value acquisition while no job is being executed. On the contrary, the snapshots are taken only for a part of the counters, and it is therefore possible to complete copying during a period when no job is being executed.

Settings for Counter Acquisition

Figure 10:
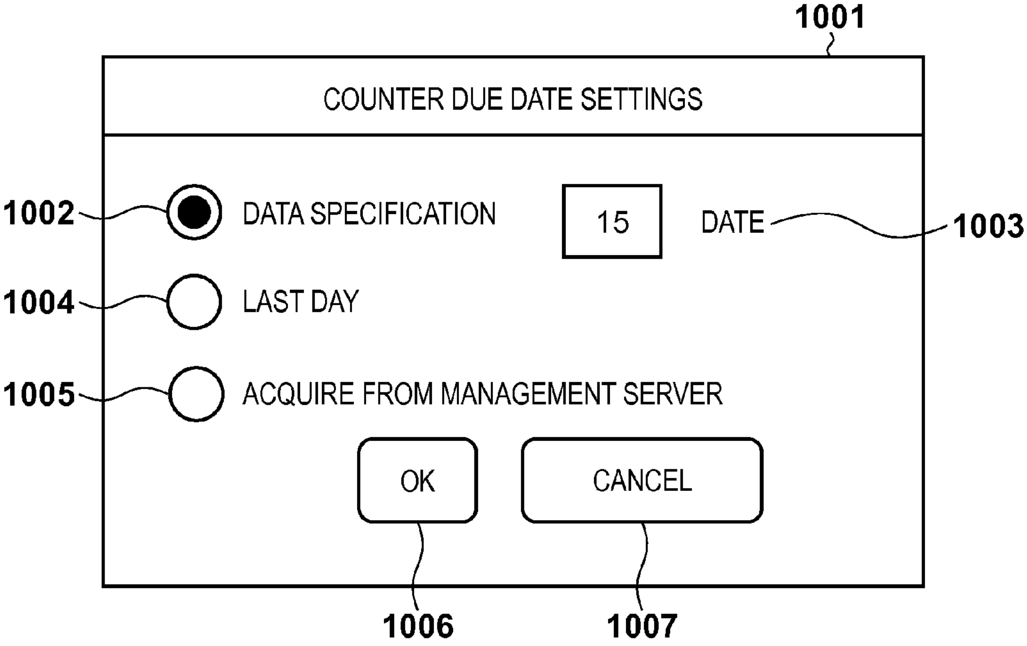
FIG. 10 is a diagram showing an exemplary operation screen of the monitoring apparatus 101 in an embodiment.

FIG. 10 shows an example of a due date acceptance screen displayed on the display device 209 by the monitoring apparatus 101 via the display control unit 206. In the example in FIG. 10, an administrator, for example, can designate a due date specification method from these three options; date specification, the last day of every month, and acquisition from the management server. In the case of date specification, the specified date is also input. Note that the management server refers to the management apparatus 107. The designation on this screen is accepted by the command processing unit 502 and then processed by the setting change unit 503, and the processing result is recorded in the storage unit 507. The due date information recorded in the storage unit 507 is read by the acquisition processing unit 504, specifically in step S1202 in FIG. 12.

FIGS. 11A to 11D show examples of setting data concerning counter acquisition and transmission held by the monitoring apparatus 101. The setting data is stored in the RAM 203 or the HDD 208 by the storage unit 507. The setting data may be input by an administrator using a user interface that is not shown in the figure, or may be acquired from the management apparatus 107. Alternatively, the setting data may be set in another method.

The setting data contains the transmission method name, the number of pieces of corresponding transmitted data, and the type of transmitted data. FIGS. 11A and 11B are examples indicating the type of data transmission from the monitoring apparatus 101 to the management apparatus 107. FIG. 11A is an example of setting data for transmitting the values of the department counter and the charging counter as counters for charging. FIG. 11B is an example of setting data for transmitting only the values of the charging counter as the counter for charging. The setting data in FIG. 11A is set as transmission information on the monitoring apparatus 101 in the case where, for example, a sales company provides a client with not only the charging counter values but also charging information on each department, and the setting data in FIG. 11B is set as transmission information on the monitoring apparatus 101 in the case of not providing the client with the charging information on each department.

The setting data also contains time settings for regularly acquiring the department counter values and the charging counter values. FIG. 11C shows the settings for regularly acquiring the department counter values and the charging counter values. "Acquisition" means processing for acquiring the counter values from all image forming apparatuses that are the monitoring targets for the monitoring apparatus 101, and "re-acquisition" means processing for acquiring the counter values that are the acquisition targets from the image forming apparatuses from which acquisition by the "acquisition" processing failed. As for "acquisition interval" and "re-acquisition interval", generally the "acquisition interval" is about 12 hours or about 24 hours, for example, and the "re-acquisition interval" is about 1 to 2 hours, for example.

The setting data also contains settings for snapshots. FIG. 11D shows the settings for snapshot acquisition, and includes an acquisition start time and an acquisition interval. The acquisition start time indicates the time to transmit a snapshot acquisition instruction to the image forming apparatus. It is preferable that the snapshot acquisition interval is prepared separately from the acquisition interval in FIG. 11C in order to reduce a communication load on the image forming apparatus. It should be noted that the snapshot acquisition instruction time is the time when the instruction is transmitted to the image forming apparatus, and is not the snapshot acquisition time.

Counter Value Acquisition Processing by Monitoring Apparatus 101

Figure 12:
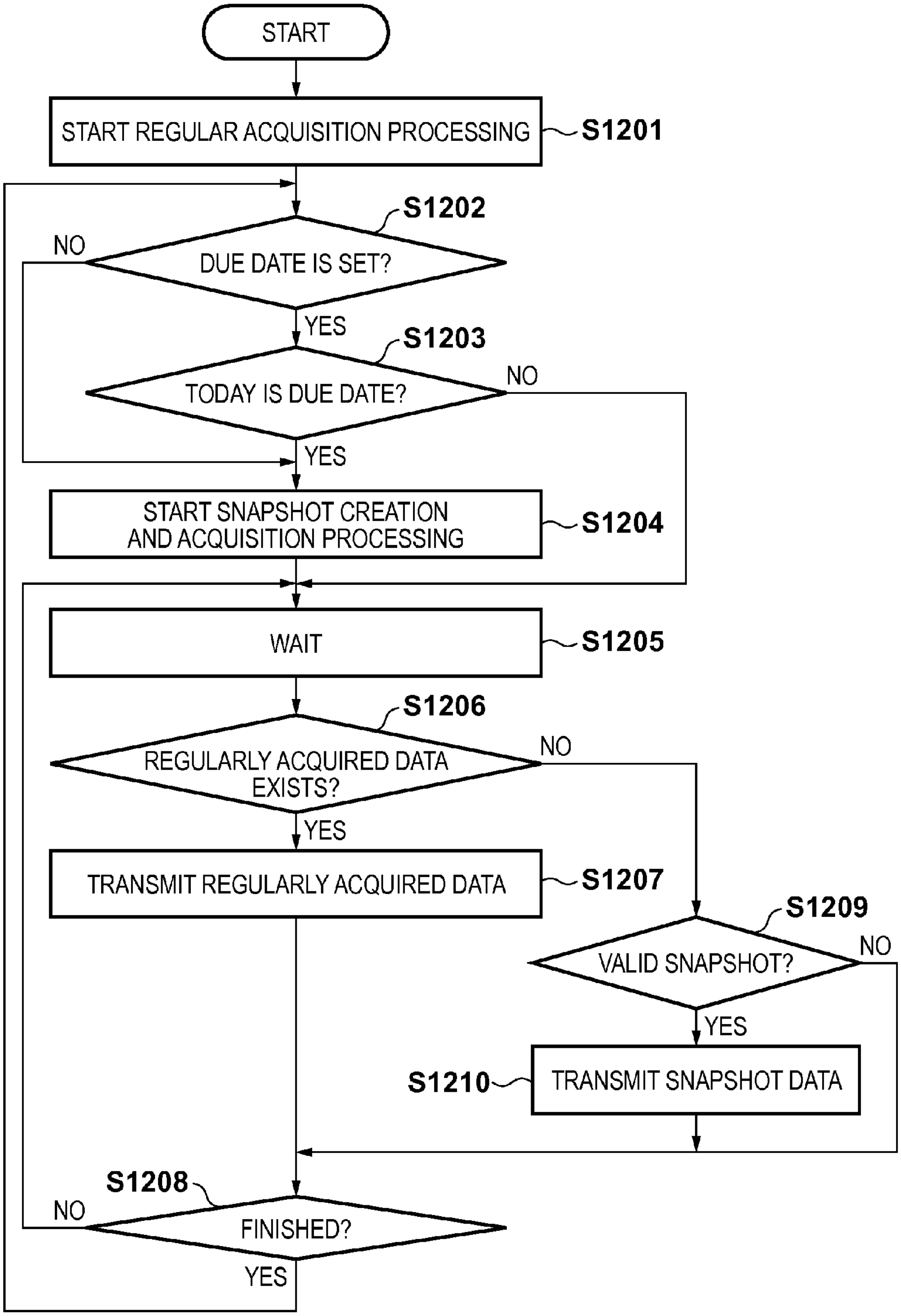
FIG. 12 is a flowchart showing a procedure of counter value acquisition processing by the monitoring apparatus 101.

FIG. 12 is a flowchart showing processing for acquiring the counter values from the image forming apparatus 102 performed by the monitoring apparatus 101 executing the monitoring program 405 stored in the ROM 202. Before the processing is started, the data are set in the format shown in FIGS. 11A to 11D in the RAM 203 or the HDD 208.

In step S1201, processing for regularly acquiring the department counter values and the charging counter values is started. The regular acquisition processing started here will be described later in detail using the flowcharts in FIGS. 13 to 15. The regular acquisition processing is executed as, for example, a process independent from the processing in FIG. 12. Accordingly, once started in step S1201, the counter value acquisition is regularly performed separately until this process is stopped. Next, in step S1202, it is determined whether or not the due date is set in the RAM 203 or the HDD 208. If it is determined that the due date is set, in step S1203 the due date is compared with the current date. If it is determined that the due date agrees with the current date, the processing in step S1204 is performed, and if not, the process in step S1205 onward is performed.

Meanwhile, if, in step S1202, it is determined that the due date is not set, the processing in step S1204 onward is performed.

Figure 16:
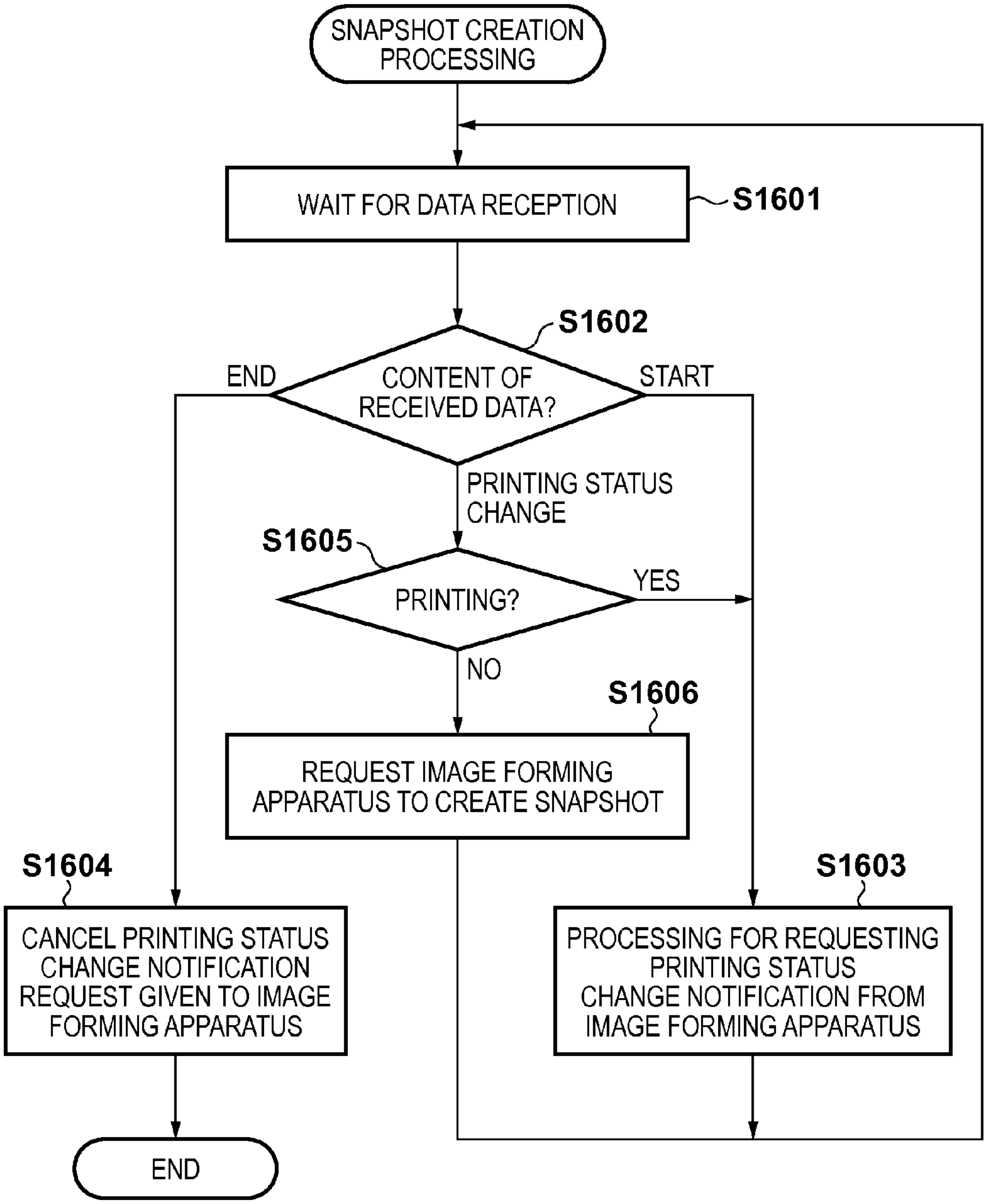
FIG. 16 is a flowchart showing snapshot creation processing by the monitoring apparatus 101.

In step S1204, prior to the counter value acquisition, snapshot creation processing and snapshot acquisition processing are started. The processing started here will be described later in detail using FIGS. 16 and 17. Both the snapshot creation processing and the snapshot acquisition processing are executed as processes independent from the processing in FIG. 12, for example. The processes may be prepared for the respective image forming apparatuses, or a single process may handle all image forming apparatuses. To simplify the description, it is assumed here that each one of the processes in FIGS. 16 and 17 is for all image forming apparatuses. Note that in step S1204, a “start” command is issued for the process in FIG. 16.

In step S1205, the monitoring apparatus 101 waits until the time to transmit the counter values from the monitoring apparatus 101 to the management server 107. The transmission time, which is not shown in the figure, is stored by the storage unit 507 in the RAM 203 or the HDD 208.

In step S1206, counter value information stored in the format in FIG. 8 in the RAM 203 or the HDD 208 is referred to. It is determined whether or not the regularly acquired data, which indicates the department counter values and the charging counter values, is valid data. The valid data refers to the data acquired after the most recent transmission time. If the acquisition time is before the most recent transmission time, or is not set, the data is determined to be invalid. Note that in the present embodiment, acquisition and transmission of the counter values are performed asynchronously as separate processes, and therefore, the date and time when the counter value transmission is completed in step S1207, for example, is stored as the most recent transmission time in a predetermined nonvolatile storage area. The stored time may be referred to as “most recent transmission time”. In the case where the counter value acquisition failed, the invalidity of data can be determined by recording, as the counter value acquisition time, an old date and time that is not usually recorded, and the validity of data can also be thus determined.

If, in step S1206, it is determined that there is valid regularly acquired data, the processing in step S1207 is performed. In step S1207, the transmission control unit 509 transmits the department counter values and the charging counter values stored in the RAM 203 or the HDD 208 via the network I/F 204 to the management server 107.

Meanwhile, if, in step S1206, it is determined that there is no valid regularly acquired data, processing in steps S1209 and S1210 concerning snapshot transmission is performed.

In step S1209, it is determined whether or not the snapshot is valid based on the acquisition time entry 820 in the counter information stored in the format in FIG. 8. The determination method here is the same as that in step S1206.

If, in step S1209, the snapshot is determined to be effective, in step S1210 the transmission control unit 509 transmits the charging counter values acquired as the snapshot via the network I/F 204 to the management server 107.

If, in step S1208, it is determined that the counter information transmission to the management server 107 for the day is finished, the snapshot creation and transmission processing ends, the monitoring apparatus 101 waits until the date changes, and the processing then returns to step S1202. If not, the processing returns to step S1205 and the monitoring apparatus 101 waits until the next transmission time. In step S1208, the counter information transmission is determined to be finished when, for example, the counter value acquisition and transmission attempts are completed for all monitoring-target image forming apparatuses. After the counter information transmission is finished, the snapshots are not necessary any more, and so an “end” command for the process in FIG. 16 that was started in step S1204 is transmitted to stop the snapshot creation processing.

Counter Value Regular Acquisition Processing

Figure 13:
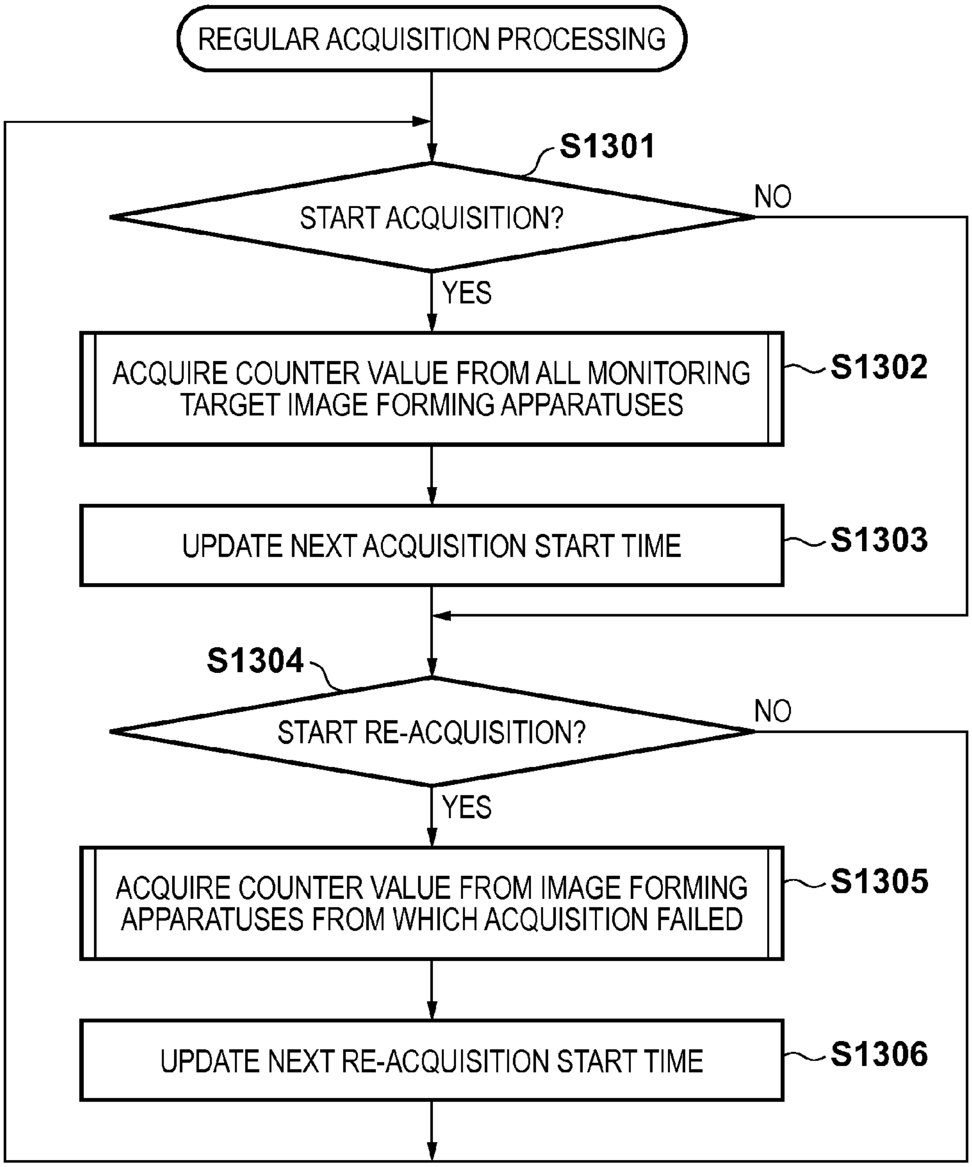
FIG. 13 is a flowchart showing a procedure of counter value acquisition processing by the monitoring apparatus 101.

The regular acquisition processing started in step S1201 will be described in detail using the flowcharts in FIGS. 13, 14, and 15. As for those flowcharts, FIG. 13 is a flowchart showing the overall regular acquisition processing, and the execution thereof is started in step S1201 in FIG. 12. The processing shown in those flowcharts is executed by the monitoring program 405 stored in the ROM 202 in the monitoring apparatus 101.

In step S1301, the acquisition start time shown in FIG. 11C stored in the RAM 203 or the HDD 208 is read. If the current time is determined to be the “next acquisition start time” or later, the processing in step S1302 onward is performed. If the current time is determined to be earlier than the “next acquisition start time”, the processing in step S1304 onward is performed.

In step S1302, the department counter values and the charging counter values are acquired from all monitoring-target image forming apparatuses. The processing details of this step will be described later using the flowchart in FIG. 14.

After the acquisition processing is finished, in step S1303 the “acquisition interval” is added to the “next acquisition start time”, and the result of addition is set as the new “next acquisition start time”.

If, in step S1304, the current time is determined to be the “next re-acquisition start time” or later, the processing in step S1305 onward is performed. If the current time is determined to be earlier than the “next re-acquisition start time”, the processing returns to step S1301.

In step S1305, the department counter values and the charging counter values are acquired from the image forming apparatuses from which acquisition by the acquisition processing in step S1302 failed. The processing details of this step will be described later using the flowchart in FIG. 15.

After the acquisition processing is finished, in step S1306 the "re-acquisition interval" is added to the "next re-acquisition start time", and the result of addition is set as the new "next re-acquisition start time".

Processing for Acquiring Counter Value from Monitoring-Target Image Forming Apparatus The processing in step S1302 will be described in detail using the flowchart in FIG. 14.

In step S1401, the charging counter values are acquired from the image forming apparatuses. A charging counter acquisition request from the monitoring apparatus 101 is issued by the command issue unit 508, and the transmission control unit 509 causes the request to reach the command processing unit 602 in each image forming apparatus via the network I/F 204. Then, the acquisition unit 603 in the image forming apparatus acquires the charging counter values, and the transmission control unit 605 transmits the acquired charging counter values via the network I/F 306 to the monitoring apparatus 101. The charging counter values acquired in step S1401 correspond to the tables 703 and 704 in FIG. 7C.

In step S1402, the number of departments is acquired. The data exchange route between the monitoring apparatus 101 and the image forming apparatus is the same as that in step S1401. The number of departments acquired in step S1402 is contained in the table 701 in FIG. 7A. In step S1403, the number of department counters is acquired.

In step S1404, the department counter values for the number of department counters are acquired from the image forming apparatus. The department counter values acquired in step S1404 correspond to the table 702 in FIG. 7B for each department.

If, in step S1405, it is determined that not all department counters have been acquired, the processing returns to step S1404. If it is determined that all department counters have been acquired, the processing in step S1406 onward is performed.

If, in step S1406, it is determined that the processing has not been performed for all departments, the processing returns to step S1403. If it is determined that the processing has been performed for all departments, the processing in step S1407 onward is performed.

After the department counter value acquisition processing is finished for all departments, in step S1407 the charging counter is acquired again. Thus the charging counter is acquired before and after the department counter acquisition.

In step S1408, the charging counter values acquired in step S1401 are compared with the charging counter values acquired in step S1407. If it is determined that those charging counter values agree with each other, the processing in step S1409 onward is performed, and if not, the processing in step S1410 onward is performed.

In step S1409, it is determined that the department counter values and the charging counter values are consistent with each other, and the data acquisition time and the acquired counter values are stored in the format shown in FIG. 8 in the RAM 203 or the HDD 208. Here, the items from the data acquisition time 802 to the charging counter 819 are stored.

Meanwhile, in step S1410, the department counter values and the charging counter values are not consistent with each other, and therefore, information indicating acquisition failure is stored in the RAM 203 or the HDD 208. In an example of the method for storing the information indicating acquisition failure, a predetermined value indicating the time before the stored last data transmission time, such as 0:0:0 on Jan. 1, 1970, for example, is set as the data acquisition time 802.

If, in step S1411, it is determined that the counter acquisition processing is finished for all image forming apparatuses, the processing ends.

Figure 15:
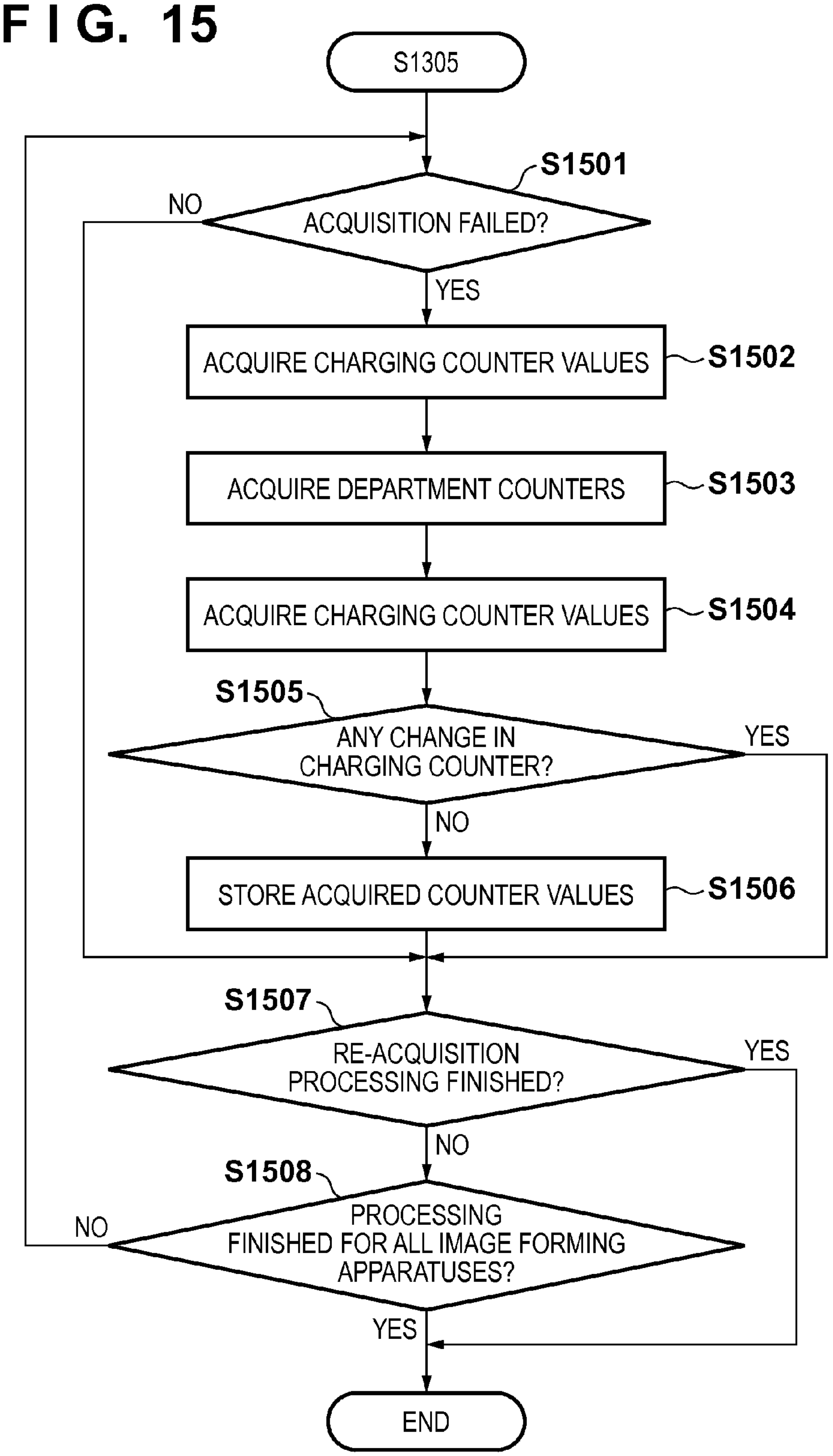
FIG. 15 is a flowchart showing a procedure of counter value acquisition processing by the monitoring apparatus 101.

In the flowcharts in FIGS. 13 and 15, whether or not the counter value acquisition was successful can be determined from the acquisition time 802 contained in FIG. 8. With an alternative method, flags may be provided, and "1" and "0" may be stored respectively for success and failure in the RAM 203 or the HDD 208.

Counter Value Re-Acquisition Processing

The processing in step S1305 will be described in detail using FIG. 15.

In step S1501, it is determined whether or not the counter value acquisition from each target image forming apparatuses failed. If it is determined to be successful, the processing in step S1507 onward is performed. If it is determined to be unsuccessful, the processing in step S1502 onward is performed.

The processing from steps S1502 to S1504, which is the same as the processing in steps S1401 to S1407, will be omitted here. Step S1503 here includes steps S1402 to S1406 in FIG. 14.

In step S1505, the charging counter values acquired in step S1502 are compared with the charging counter values acquired in step S1504. If it is determined that those values do not agree with each other, the processing in step S1507 onward is performed, and if it is determined that those values agree with each other, the processing in step S1508 onward is performed.

In step S1506, similarly to step S1409, the acquired department counter values and charging counter values, and the data acquisition time are stored in the format shown in FIG. 8 in the RAM 203 or the HDD 208.

In step S1507, the following two points are determined. Firstly, whether or not the re-acquisition processing has been performed for all devices from which the acquisition failed, and secondly, whether or not the current time is the "next acquisition start time" or later, are determined. The second determination is necessary because, in the present embodiment, the re-acquisition processing is stopped at the regular acquisition processing start time even in the middle thereof, and the second determination is not essential for the present invention. If the result of at least one of the first and second determinations is affirmative the result in step S1507 is determined as YES, and if not, the result is determined as NO.

If, in step S1507, the result of the determination is YES, the re-acquisition processing ends, and if the result is NO, in step S1508 it is determined whether or not the processing for all image forming apparatuses has been finished. If it is determined to be finished, the re-acquisition processing ends, and if not, the processing returns to step S1501.

Snapshot Creation Processing

The processing concerning the snapshot will be described in detail using FIGS. 16 and 17. The flowcharts in these figures show the operations of the monitoring program 405 stored in the ROM 202 in the monitoring apparatus 101.

FIG. 16 is a flowchart showing the processing by the monitoring apparatus 101 for requesting snapshot creation from an image forming apparatus. This processing is an independent process started in step S1204 in FIG. 12.

In step S1601, the monitoring apparatus 101 waits for data reception. The data transmission source is the monitoring apparatus 101 itself and each image forming apparatus.

Upon the data being received, in step S1602 the content of the received data is determined. If the received data is "start"

from the monitoring apparatus itself, in step S1603 a printing status change notification request is transmitted to all the image forming apparatuses that are the monitoring targets for the monitoring apparatus 101 requesting each image forming apparatus to give a notification of the change in the printing status. The printing status change notification request from the monitoring apparatus 101 is received by the command processing unit 602 in each image forming apparatus, and printing status change notification destination information is stored in the storage unit 606.

If the received data is "end" from the monitoring apparatus itself, in step S1604 all image forming apparatuses that are the monitoring targets for the monitoring apparatus 101 are notified of cancellation of the printing status change notification request, and the processing ends.

If the received data is "printing status change" from any of the image forming apparatuses, in step 1605 it is determined whether or not the notified status is "printing" or not. The notification of "printing status change" is given when the printing status of each image forming apparatus changed, that is, when a printing state changed to a non-printing state and when a non-printing state changed to a printing state.

If, in step S1605, it is determined that the printing status is "printing", the processing proceeds to step S1603 and the printing status change notification request is transmitted. Here, in step S1603 after step S1605, the request is transmitted to the image forming apparatuses that gave the printing status change notification and were the subject of the determination in step S1605. After that, the processing returns to step S1601, and the monitoring apparatus 101 waits for data reception. If it is determined not to be printing, in step S1606 a snapshot creation request is transmitted to the image forming apparatuses. Also in this case, the request is transmitted to the image forming apparatuses that gave the printing status change notification and were the subject of the determination in step S1605. After that, the processing returns to step S1601, and the monitoring apparatus 101 waits for data reception.

Figure 17:
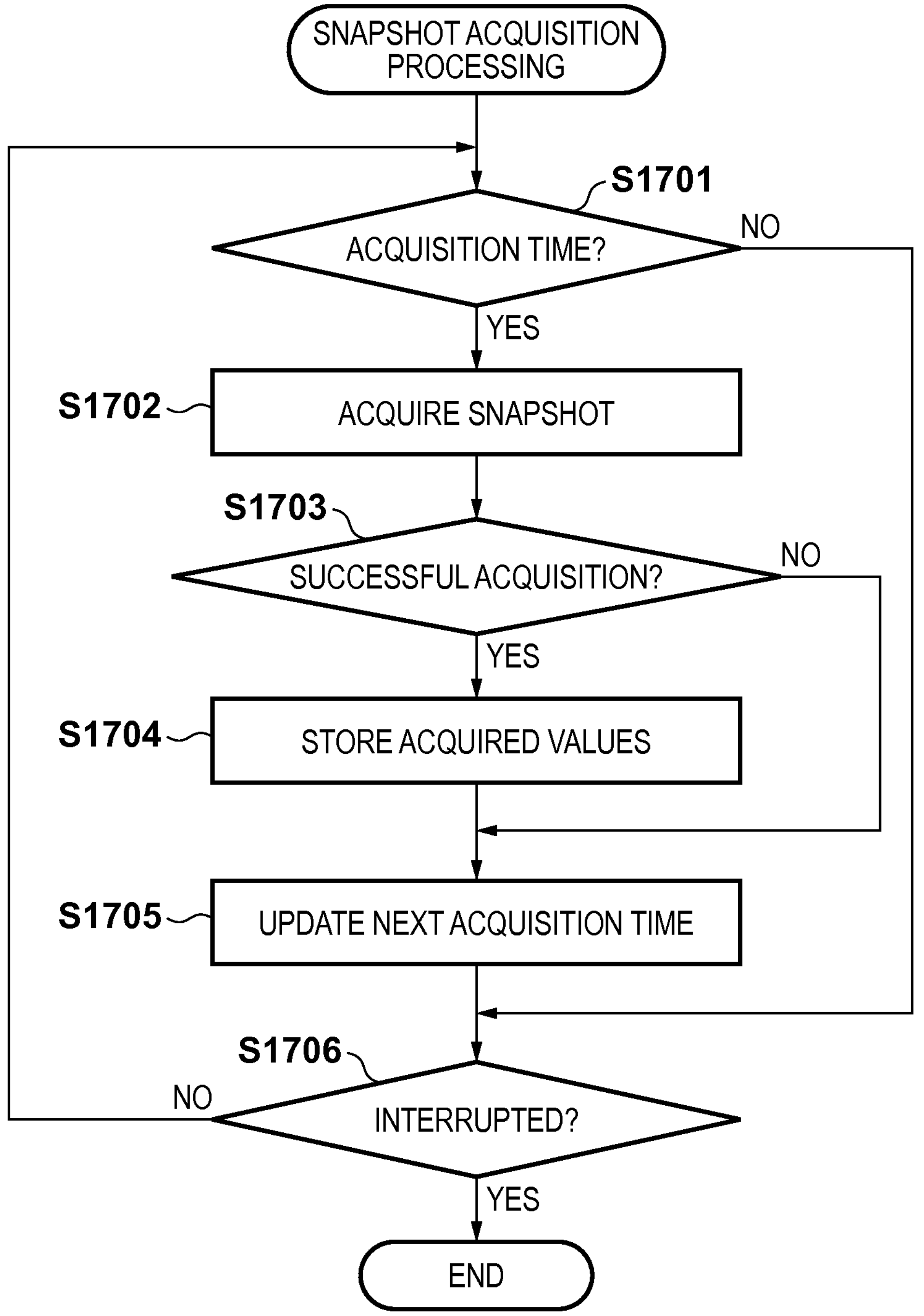
FIG. 17 is a flowchart showing snapshot creation processing by the monitoring apparatus 101.

FIG. 17 is a flowchart showing processing by the monitoring apparatus 101 for regularly acquiring snapshot data the monitoring apparatus 101 requested to be created from the image forming apparatus. The processing in FIG. 17 is also an independent process. In step S1701, it is determined whether or not the current time is the acquisition time or later. If it is determined that the current time is the acquisition time or later, the processing in step S1702 onward is performed. The acquisition time is obtained by referring to the acquisition start time shown in FIG. 11D.

In step S1702, a snapshot acquisition request is issued to the image forming apparatuses. Exemplary transmission protocols for this acquisition request include SNMP (Simple Network Management Protocol).

In step S1703, it is determined whether or not snapshot acquisition was successful. Success and failure can be determined based on the response from the image forming apparatuses, for example. If successful, in step S1704 the acquired counter values and the data acquisition time are stored in the RAM 203 or the HDD 208 in the format shown in FIG. 8. Then in step S1705 the next acquisition time is updated.

In step S1706, it is determined whether or not there is an interrupt command. If it is determined that there is an interrupt command to end the processing, the snapshot data acquisition processing ends. If not, the processing returns to step S1701. The interrupt command is transmitted in the case where, for example, the determination result in step S1208 in FIG. 12 is "finished". This interrupt command may be the same as the "end" command for the processing in FIG. 16.

As described above, even when an inconsistent state between the department counter values and the charging counter values cannot continue because printing is executed while the charging counter information is being acquired, the printing status of the image forming apparatuses is monitored, and snapshots are created while printing is not executed. It is thus possible to notify the management server of the minimum required data for charging.

Embodiment 2

In Embodiment 2, whether or not to transmit a snapshot is determined depending on the data type of the counters for charging defined as being transmitted from the monitoring apparatus 101 to the management apparatus (management server) 107. In step S1209, the validity of the snapshot is determined. At that time, in the present embodiment, if the definition of data held by the monitoring apparatus 101 to be transmitted to the management server 107 includes the department counter and the charging counter as shown in FIG. 11A, for example, the snapshot data is determined to be insufficient and thus invalid, and is not transmitted to the management server.

Thus, useless insufficient data that cannot be used for providing service is not transmitted.

Also in the case other than the above-mentioned one, if the validity of snapshot is determined in advance and the snapshot data is determined to be insufficient and thus not valid for the counter type based on the definition of data to be transmitted to the management server 107, the action of not acquiring the snapshot data from the image forming apparatus can be implemented. That is, it is also possible, based on the determination of whether or not to manage the image forming apparatuses for charging by department, to execute the above-mentioned snapshot copy instruction and acquisition processing only in the case where the image forming apparatuses are managed for charging by department.

Embodiment 3

In the present embodiment, the snapshot data is acquired from the image forming apparatuses from which data for charging cannot be acquired for a long time with the regular acquisition processing and the re-acquisition processing. For this snapshot data acquisition, in step S1206 or immediately before step S1206, the data acquisition time 802 is compared with the current time, and if it is determined that the department counter values and the charging counter values have not been acquired for a certain time period or longer, a snapshot is immediately acquired. That is, in this case, the processing proceeds to S1209 regardless of existence or non-existence of the regularly acquired data. Thus the number of image forming apparatuses from which the data necessary for charging cannot be acquired decreases.

Embodiment 4

Some image forming apparatuses enter a reduced power mode if no job execution is instructed for a certain time period for the purpose of power saving. In the case of such image forming apparatuses, or in the case where a power-off time is stored as schedule information in the image forming apparatus or in a power-off schedule controller connected to the image forming apparatuses via a network, the information is acquired therefrom and is stored in the RAM 203 or the HDD 208.

If, in step S1203, the current date is determined to be the due date, in step S1204 the acquisition start time and the acquisition interval in FIG. 11C are set, in accordance with the power-off schedule, to values with which, for example, a snapshot is acquired immediately before power-off. Further, in step S1205 the monitoring apparatus 101, upon receiving a notification of scheduled entering of the reduced power mode, immediately acquires a snapshot. It is thus possible to acquire data necessary for charging even if power saving settings are configured in the image forming apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-226225, filed Oct. 13, 2011, which is hereby incorporated by reference herein in its entirety.

What is claimed is:

1. A management system for managing information concerning an amount of usage of an image forming apparatus, the system comprising the image forming apparatus and a monitoring apparatus connected to the image forming apparatus, wherein the image forming apparatus comprises:

a recording unit configured to record, as counter information, counter values of a plurality of types in a storage device in the image forming apparatus; and a copying unit configured to make, in the storage device, a copy of a part of the counter information between image forming operations, and wherein the monitoring apparatus comprises:

a first acquisition unit constructed to acquire the counter values of the plurality of types recorded in the storage device;

a storing unit constructed to store the acquired counter values of the plurality of types as valid counter values if the acquired counter values are consistent with one another;

a second acquisition unit constructed to acquire, from the image forming apparatus, the part of the counter values whose copy was made by the copying unit; and a transmission unit constructed to transmit the stored valid counter values to a management apparatus connected to the monitoring apparatus, wherein the storing unit stores, as the valid counter values, the part of the counter values whose copy was made by the copying unit that was acquired by the second acquisition unit if the acquired counter values of the plurality of types are inconsistent with one another, and wherein the transmission unit is constructed to transmit the counter values acquired by the first acquisition unit to the management apparatus without transmitting the part of the counter values whose copy was made by the copying unit acquired by the second acquisition unit if the counter values acquired by the first acquisition unit are stored as the valid counter values.

2. The management system according to claim 1, wherein the monitoring apparatus further comprises an instruction unit constructed to instruct the image forming apparatus to make a copy of the counter values by the copying unit, prior to the counter value acquisition by the first acquisition unit, and wherein the copying unit makes, in the storage device, a copy of the part of the counter values between image forming operations in response to reception of the copy instruction.

3. The management system according to claim 2, wherein the first acquisition unit acquires counter values of a total counter and a department counter, and the storing unit stores, as valid counter values, the part of the counter values whose copy was made in response to reception of the copy instruction and that was acquired by the second acquisition unit if the acquired counter values of the total counter and the department counter are not consistent with each other.

4. The management system according to claim 3, wherein the instruction unit does not instruct the image forming apparatus to make a copy of the counter values by the copying unit if the image forming apparatus is a target of management for charging by department.

5. The management system according to claim 1, wherein the first acquisition unit acquires a counter value of a total counter that records the number of total outputs, before and after acquisition of counter values of counters of other types, and the storing unit determines that there is consistency if the acquired two counter values of the total counter agree with each other, and stores, as valid values, the counter values of the total counter and the counters of other types acquired by the first acquisition unit.

6. A monitoring apparatus for acquiring counter values as counter information from an image forming apparatus having a recording unit configured to record counter values of a plurality of types in a storage device in the image forming apparatus and a copying unit configured to make, in the storage device, a copy of a part of the counter information between image forming operations, the monitoring apparatus comprising:

a first acquisition unit constructed to acquire the counter values of the plurality of types recorded in the storage device;

a storing unit constructed to store the acquired counter values of the plurality of types as valid counter values if the acquired counter values are consistent with one another;

a second acquisition unit constructed to acquire, from the image forming apparatus, the part of the counter values whose copy was made by the copying unit; and a transmission unit constructed to transmit the stored valid counter values to a management apparatus connected to the monitoring apparatus, wherein the storing unit stores, as the valid counter values, the part of the counter values whose copy was made by the copying unit that was acquired by the second acquisition unit if the acquired counter values of the plurality of types are inconsistent with one another, and wherein the transmission unit is constructed to transmit the counter values acquired by the first acquisition unit to the management apparatus without transmitting the part of the counter values whose copy was made by the copying unit acquired by the second acquisition unit if the counter values acquired by the first acquisition unit are stored as the valid counter values.

7. The monitoring apparatus according to claim 6, further comprising an instruction unit constructed to instruct the image forming apparatus to make a copy of the counter values by the copying unit, prior to the counter value acquisition by the first acquisition unit, and wherein the copying unit of the image forming apparatus makes, in the storage device, a copy of the part of the counter values between image forming operations in response to reception of the copy instruction.

8. The monitoring apparatus according to claim 7, wherein the first acquisition unit acquires counter values of a total counter and a department counter, and the storing unit stores, as valid counter values, the part of the counter values whose copy was made in response to reception of the copy instruction and that was acquired by the second acquisition unit if the acquired counter values of the total counter and the department counter are not consistent with each other.

9. The monitoring apparatus according to claim 8, wherein the instruction unit does not instruct the image forming apparatus to make a copy of the counter values by the copying unit if the image forming apparatus is a target of management for charging by department.

10. The monitoring apparatus according to claim 6, wherein the first acquisition unit acquires a counter value of a total counter that records the number of total outputs, before and after acquisition of counter values of counters of other types, and the storing unit determines that there is consistency if the acquired two counter values of the total counter agree with each other, and stores, as valid values, the counter values of the total counter and the counters of other types acquired by the first acquisition unit.

11. A management method used by a management system for managing information concerning an amount of usage of an image forming apparatus, the system comprising the image forming apparatus and a monitoring apparatus connected to the image forming apparatus, the method comprising:

a recording step, performed by the image forming apparatus, of recording, as counter information, counter values of a plurality of types in a storage device in the image forming apparatus;

a copying step, performed by the image forming apparatus, of making, in the storage device, a copy of a part of the counter information between image forming operations;

a first acquiring step, performed by the monitoring apparatus connected to the image forming apparatus, of acquiring the counter values of the plurality of types recorded in the storage device;

a storing step, performed by the monitoring apparatus, of storing the acquired counter values of the plurality of types as valid counter values if the acquired counter values are consistent with one another;

a second acquiring step, performed by the monitoring apparatus, of acquiring, from the image forming apparatus, the part of the counter values whose copy was made in the copying step; and a transmission step, performed by the monitoring apparatus, of transmitting the stored valid counter values to a management apparatus connected to the monitoring apparatus, wherein in the storing step the counter values whose copy was made in the copying step that was acquired in the second acquiring step are stored as the valid counter values if the acquired counter values of the plurality of types are inconsistent with one another, and wherein in the transmission step, the counter values acquired in the first acquiring step are transmitted to the management apparatus without transmitting the part of the counter values whose copy was made in the copying step acquired in the second acquiring step if the counter values acquired in the first acquiring step are stored as the valid counter values.

12. A non-transitory computer-readable medium storing a program for causing a computer to execute a monitoring method for acquiring counter values as counter information from an image forming apparatus having recording means configured to record counter values of a plurality of types in a storage device in the image forming apparatus, and copying means configured to make, in the storage device, a copy of a part of the counter information between image forming operations, the monitoring method comprising:

a first acquiring step of acquiring the counter values of the plurality of types recorded in the storage device;

a storing step of storing the acquired counter values of the plurality of types as valid counter values if the acquired counter values are consistent with one another;

a second acquiring step of acquiring, from the image forming apparatus, the part of the counter values whose copy was made in the copying step; and a transmission step of transmitting the stored valid counter values to a management apparatus connected to the monitoring apparatus, wherein in the storing step, the counter values whose copy was made in the copying step that was acquired in the second acquiring step are stored as the valid counter values if the acquired counter values of the plurality of types are inconsistent with one another, and wherein in the transmission step, the counter values acquired in the first acquiring step are transmitted to the management apparatus without transmitting the part of the counter values whose copy was made in the copying step acquired in the second acquiring step if the counter values acquired in the first acquiring step is stored as a valid counter values.

* * * * *